United States Patent [19]

Hermann

[11] 3,755,886
[45] Sept. 4, 1973

[54] METHOD FOR SOLDERING ELECTRICAL CONDUCTORS

[75] Inventor: Philip E. Hermann, Fort Wayne, Ind.

[73] Assignee: The Magnavox Company, Fort Wayne, Ind.

[22] Filed: Oct. 22, 1971

[21] Appl. No.: 191,845

Related U.S. Application Data

[63] Continuation-in-part of Ser. No. 813,989, April 7, 1969, abandoned.

[52] U.S. Cl......................... 29/496, 29/488, 29/503
[51] Int. Cl......................... B23k 31/02, B23k 35/36
[58] Field of Search........................ 29/471.1, 471.3, 29/495, 496, 503, 488; 228/33, 36, 37, 43; 148/23, 22

[56] References Cited
UNITED STATES PATENTS

| | | | |
|---|---|---|---|
| 2,266,060 | 12/1941 | Miller | 148/23 |
| 2,480,723 | 8/1949 | Evans et al. | 29/495 X |
| 2,829,998 | 4/1958 | Glynn et al. | 148/23 |
| 2,870,532 | 1/1959 | Young | 29/471.1 |
| 3,058,441 | 10/1962 | Walker et al. | 228/33 |
| 3,198,414 | 8/1965 | Tardoskegyi | 228/37 |
| 3,330,028 | 7/1967 | Elbredir | 148/23 X |
| 3,436,278 | 4/1969 | Poliak | 29/495 X |
| 3,445,919 | 5/1969 | Saba | 29/495 X |

OTHER PUBLICATIONS
"Solders and Soldering" by H. H. Manko, July 13, 1964, see pages 216–218.

*Primary Examiner*—Richard B. Lazarus
*Attorney*—Richard T. Seeger, Roger M. Rickert et al.

[57] ABSTRACT

In the process of soldering electrical connections in printed circuits, the printed circuit is passed through the crest of a fountain of solder which includes a water soluble hydrocarbon, polyethylene glycol, which wets the surfaces to be soldered. After soldering, a water wash is used to remove the polyethylene glycol and dross from the printed circuit work piece which may then be air dried with a dip in isopropyl alcohol if desired.

The use of a water soluble additive provides the soldering advantages which are obtained with presently used non-water soluble materials, such as Shell Oil Company's Peblum Oil (or equivalent) for example, and additionally provides the advantage of the use of an effective yet simple and inexpensive cleaning operation of the board after soldering by washing with water. This eliminates the necessity of using solvents which are relatively expensive and sometimes toxic and detrimental to the printed circuit component parts, their protective coatings, and identification markings.

5 Claims, 4 Drawing Figures

Patented Sept. 4, 1973  3,755,886

INVENTOR
PHILIP E. HERMANN
by JEFFERS & YOUNG
Attorneys

METHOD FOR SOLDERING ELECTRICAL CONDUCTORS

CROSS-REFERENCE TO RELATED APPLICATIONS

This application is a continuation-in-part of my application Ser. No. 813,989, filed Apr. 7, 1969, entitled Method for Soldering Electrical Conductors and now abandoned.

BACKGROUND OF THE INVENTION

It has been found in the process of soldering electrical connections in printed circuits, that the surface should be wetted during application of the solder so that effective soldering of the electrical connections can be made between the terminals and leads of the components and the printed conductors. Certain additives to the solder have proved to be beneficial especially with regard to decreasing clumping of the soldering material which usually results in an undesired bridging of the solder between adjacent printed circuit conductors. This problem is especially pronounced in printed circuits having a high packaging density where adjacent and separate conductors may be spaced apart by only a few thousandths of an inch. Also, needed to effect improved soldering connections, is a low viscosity of the solder as to enable the solder to flow into the slight clearance provided for example between terminals or eyelets and their corresponding electrical conductors which for reliable mechanical and electrical connection must be permeated by the solder. It is therefore, essential, not only to "wet" the opposing surface but also to reduce the surface tension of the solder thereby increasing its flowability into such areas where soldering must be relied upon to make an effective electrical connection between terminals or leads of electrical components and the conductive portions of the printed circuit board. Reduction of such surface tension also tends to prevent the forming of solder icicles during the soldering process. This reduction in surface tension and "wetting" of the surface so as to increase the flowability of the solder are desirable features of the present invention and should be clearly distinguished from the normal fluxing operation which occurs in most soldering processes. A flux, as that word relates to soldering and brazing processes, is a material used to clean and remove oxides from the surface to which the solder is to adhere. A flux might be added to the additive of the present invention or a fluxing operation might occur prior to the step of soldering in accordance with the present invention, however, the additive of the present invention functions as a "wetting" agent rather than as a flux.

In order to accomplish these results, certain additives have been combined with the solder in the form of various oils including Peblem Oil, mineral oil, peanut oil, palm oil and castor oil, to mention a few of the previously used oils which have an effect upon tin-lead solder, improving its flowability and effecting a "wetting" of the area which is intended to be soldered and promoting penetrability of the solder into the interstices between the terminal and terminal-receiving openings to form the electrical connections between the terminals and leads and the printed conductor. These oils are generally combined with the solder by mixing the two flows together and jointly directing them in the form of a fountain against the surface of the printed circuit board which includes apertures receiving terminals and leads of the electrical components. The leads and terminals are electrically connected by fillets of solder to electrically conductive paths imprinted on the substrate of the printed circuit board. The oil additive will prevent the solder from clumping and causing shorts between circuits, which may be spaced closely together in order to accommodate all of the circuits on a given substrate.

After the soldering is completed any oil residue and scavanged dross must be removed and this is accomplished by using various organic solvents such as chlorinated hydrocarbons and fluorinated hydrocarbons. The solvents indicated are difficult to handle and are contaminants which must be safely disposed of. The solvents are expensive, especially where large quantities are utilized, difficult to store and oftentime require special apparatus to employ. The solvents are generally lost to the system, and even where they are recoverable they are difficult to preserve against contamination. Organic solvent usage is objectionable for a further reason, namely insulation or protective coatings on electrical components which form a part of the printed circuit assembly may be deteriorated upon exposure to the organic solvent.

OBJECTS OF THE INVENTION

It is a primary object of the present invention to replace the conventionally used oil additive to solder with a water soluble additive which will accomplish the same wetting and surface-tension reducing functions in the solder but which can be removed by water after the soldering operation. Consequently, the process is advantageous in that it eliminates the requirement for purging solvents which are difficult to handle, are expensive in usage, and which deteriorate insulation as well as identification markings on electrical components.

A further object of the present invention is to provide a water soluble organic additive to a tin-lead solder which is stable under soldering conditions of temperature and use and can be combined with the solder to increase its permeability, thereby to form reliable solder fillet connections between terminals of electrical components and the conductive portions of the printed circuit system, and wherein the residue after soldering operation is removable by a simple water-washing technique, the water then being removed either by air drying and/or by using an alcohol rinse.

A further object of the invention is to provide a water removable additive to solder which in no manner interferes with conventional soldering and which enables such soldering in conjunction with printed circuits having closely spaced or high density of electrical printed circuit conductors on the circuit board.

Other objects and features of the present invention will become apparent from a consideration of the following description, which proceeds with reference to the accompanying drawings.

GENERAL DISCUSSION OF THE INVENTION

Figure 1:
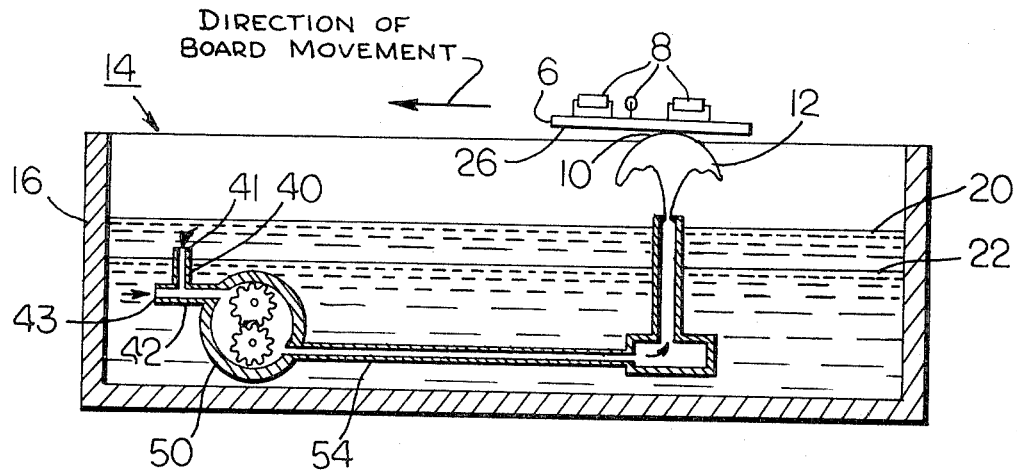
FIG. 1 is a sectional and partial schematic drawing of a typical printed circuit, fountain type, soldering apparatus with which the present invention may be utilized.

It has been known, that soldering electrical components in printed circuit boards may require the preliminary application of a flux to the printed circuit board to remove oxides from the conductors and prepare them to accept the solder. Sometimes this flux is added directly to the molten solder. The soldering of electrical components in printed circuit boards also requires an additive to the solder to improve the flowability of the solder so that the solder can penetrate and fill interstices which occur between the component lead and the opening in the printed circuit board and thereby provide a reliable electrical and mechanical connection of the component with the electrically conductive printed circuit on the printed circuit board.

Referring to the Figures, solder is applied by passing the printed circuit board 6 together with the electrical components 8 having their terminals 9 received through openings 11 in the circuit board 6, through the crest 10 of a fountain 12 of liquid solder. The soldering apparatus of FIG. 1, designated generally be reference numeral 14 consists of a pot 16 of heated solder which is of tin-lead composition that varies in accordance with physcial properties required for a particular application. Typically, the solder composition is in a range of 60-63 parts of tin to 40-37 parts of lead and the bath of molten solder 22 is maintained at a higher temperature than the melting temperature of the solder so that the work piece is also heated sufficiently for optimum soldering operation.

Normally, for immersion or dip type soldering the solder bath temperature is maintained about 50° F higher than the melting temperature of the solder and as an example, the solder bath temperature using a 63-37 tin-lead composition would be approximately 415° F. For fountain soldering the soldering temperature is higher than practiced with immersion type soldering because the work piece moves over the fountain of a solder at a faster rate and must become heated during exposure to the fountain. The temperature will among other factors depend upon the workpiece and the speed at which the workpiece is moved over the solder fountain. In some typical embodiments using a workpiece 2 inches wide with a solder fountain or wave of approximately the same width and a workpiece movement speed of approximately 2-4 feet per minute, the solder temperature was maintained between 475° and 500° F. Of course, this temperature may be lowered where a lower temperature solder is utilized.

The soldering fountain as illustrated in FIG. 1 is developed by admixing a flow of solder and additive, these two materials being immiscible and collecting in two layers 20 and 22, the lower layer being the solder and the upper layer 20 being the lighter organic additive which improves the flowability and reduces internal cohesiveness of the solder at the time it is applied. One of the technical problems associated with adequate soldering arises from the very nature of the printed circuit board. Under certain environmental and circuit operating conditions, it is possible to have high density printed circuitry in for example military equipment which may have spacing between adjacent printed circuit conductors of as small as 0.01 inch and should the solder have high internal cohesive properties, it will clump at the time it is applied and produce inadvertent and undesirable bridging and shorting between circuits. It is also an object, of course, to limit the situs of the solder so that it will form a fillet 24 (FIG. 3) and form an electrical connection between the lead or terminal 9 and the electrically conductive printing of copper, silver or the like 26 which has been previously applied to the printed circuit board and has been prepared to readily accept the solder by a prior treatment including cleaning and flux application if required. This prior fluxing operation is illustrated by the block labeled "Preparation for Soldering" in the flow chart of FIG. 2.

In order for the solder to accomplish its purpose, it must be admixed with an additive and the additive in molten form as a supernatant layer is indicated by reference numeral 20 in FIG. 1.

A conduit 40 having an opening 41 within the supernatant layer 20 provides a steady supply of such material which is then combined with a flow of solder from supply conduit 42 having an opening 43 in the sublayer of solder 22. The two flows are then forced under pressure from a gear pump 50 through a supply line 54 and outlet line 56 to form a fountain 12 of the two materials. At the upper or crest 10 the solder, together with the additive, is applied against the surface of the printed circuit. This fountain soldering process as thus far described is more fully illustrated in U.S. Pat. No. 3,058,441 to Walker et al entitled "Soldering Apparatus and Method of Soldering Electrical Conductors."

The additive in the present invention may take the form of polyethylene glycol which is water soluble and which has a flash point above the soldering temperature so that it will not evaporate or decompose at soldering temperatures. The solder additive in no way interferes with the functions of the solder and it reacts with oxides of the lead and tin forming the solder, and serves as a scavenger which will absorb any dross within the solder to improve the flowability and decrease clumping or internal cohesiveness of the solder. In contradistinction a flux reacts with oxides of the copper, silver, or other conductors to clean them and enable the solder to adhere more tenaciously to their surface. Thus a flux acts on the surfaces to which the solder is to adhere while the additive of the present invention acts on the molten solder itself to act as a wetting agent and improve the flow characteristics of that molten solder. In addition, it has been found that the heat retaining capabilities of the polyethylene glycol is greater than the presently used additives such as for example the previously mentioned Peblum Oil which tends to thin out to a greater extent during use than the described glycols. The heat retaining characteristic provides a more persistent heating effect which allows the additive to separate from the solder.

As an example of water soluble additives which can be used in improving the permeability and penetratibility of the solder and reducing its surface tension, I found that polyethylene glycol materials meet all of the functional requirements for flash point, heat resistance, combinability with the solder and non interference with soldering functions and are water soluble.

Of course, it is understood that the flash point of the polyethylene glycol must be compatible with the temperature requirememt of the solder which is being utilized and the use of a high temperature type solder will require a polyethylene glycol with a correspondingly higher flash point to prevent decomposition of the glycol during use as well as to prevent fire hazards. The polyethylene glycol has a molecular weight range from about 600 to 9,500 and an average molecular weight of approximately 4,500. The polyethylene glycol material is available from the Dow Chemical Company under the trademark "POLYGLYCOL" and from Union Carbide under the trademark "CARBOWAX." The polyethylene glycol material is a viscous liquid to waxy like solid at room temperature and generally has the effect of reducing the surface tension of the solder. With extremely closely spaced circuits it will prevent a solder build up on the component leads and land areas to prevent occurrence of bridgings of the circuits. Suitable polyethylene glycols for the present invention are available with flash points above typical soldering temperatures and such materials are uniformly water soluble.

Figure 2:
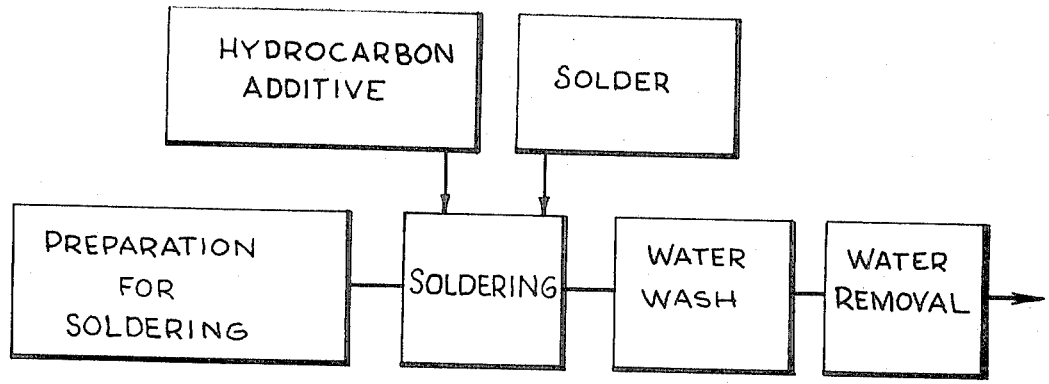
FIG. 2 is a block diagram illustrating the processing steps by which the printed circuit is prepared for soldering then successively soldered, washed and dried.
Figure 3:
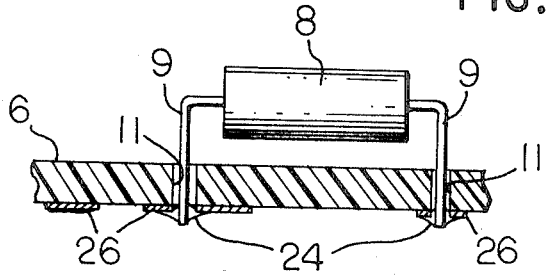
FIG. 3 is an enlarged sectional view illustrating one type soldered connection between the terminals of an electrical component and the conducting portion of the printed circuit; and, FIG. 4 illustrates an immersion type method of applying solder to a printed circuit and employing the principles of this invention.

Subsequently to the soldering operation, I next wash the soldered printed circuit board with warm water which will remove any dross and any residual polyethylene glycol, this step being indicated in FIG. 2. Although, it was not found to be necessary, a detergent may be utilized in the water washing operation after which a second water rinse may be used if desired to insure complete removal of detergent from the board. I then remove the water in some instances by dipping the washed printed circuit board within isopropyl alcohol. It is not necessary however, to remove the water in this fashion, any satisfactory drying method is contemplated including air drying.

Figure 4:
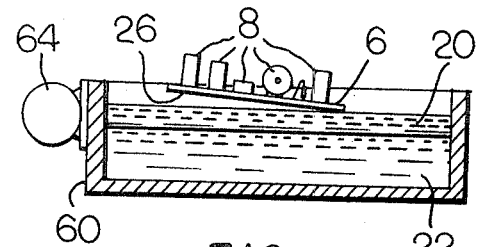

The solder can be applied not only by a fountain application; it can also be obtained by dipping the printed circuit board within a pot 60 of soldering material which may be agitated by an agitator 64 into which has been admixed the polyethylene glycol as indicated in FIG. 4, in which case the temperatures do not have to be as great since exposure is for a greater period of time giving an opportunity for the printed circuit board to be heated up to proper temperature within a longer duration. Before soldering, the assembled printed circuit board and its related components may be prepared for soldering in accordance with my invention by a cleaning and/or fluxing operation if desired by any conventional manner and although this operation is indicated in the block diagram of FIG. 2, it does not form of itself an essential part of the immediate invention. It should be noted, however, that the polyethylene glycol functions as a wetting agent rather than as a flux, and that any desired fluxing would normally be performed prior to the soldering step, or in some instances, a flux might be added either to the solder or to the polyethylene glycol additive so that the fluxing would occur contemporaneously with the soldering step.

Other organic additives to the solder, which are water soluble are contemplated by the present invention. All that is required is that the material be of a sufficiently high flash point, will render the solder flowable by reducing its surface tension and viscosity, and will combine with oxides of the solder to form dross. The advantage of such materials being water soluble is that subsequently to soldering there is no need for exposure to organic solvents which are in no way comparable to water for convenience, cost and disposability. Also, by using water it is possible to preserve the insulation or protective coating of electrical components against swelling and other undesirable deterioration which would otherwise occur upon exposure to the solvent which, as previously mentioned, is typically flourinated or chlorinated hydrocarbons.

By means of the present invention I have eliminated substantial factors of solvent costs and necessity for special equipment for handling and disposing of organic solvents and further avoid these serious degrading effects on electrical components.

Although the present invention has been illustrated and described in connection with certain selected example embodiments it will be understood that these are illustrative of the invention and that it is reasonably to be presumed that those skilled in the art, with the aid of the present disclosure will elect numerous equivalents which function in substantially the same manner, for substantially the same reason to yield substantially the same effects. I intend to include such equivalents and variations within the scope of the present invention and are intended to be included within the scope of the following claims as equivalents of the invention.

What is claimed is:

1. The method of applying solder to a conductor comprising the steps of:
   combining molten solder and a water-soluble polyethylene glycol hydrocarbon to improve the flow characteristics of the molten solder, said molten solder and said hydrocarbon being immiscible and said hydrocarbon removing oxides from said molten solder and acting as a wetting agent for said molten solder relative to the conductor;
   cleaning the conductor;
   passing the thus cleaned conductor through a wave of the combined molten solder and water-soluble hydrocarbon to effect the adhesion of solder to said conductor;
   cooling the conductor and adhering solder to solidify said solder;
   washing the conductor and adhering solder with water to remove any residual water-soluble hydrocarbon; and
   drying the water from the washed conductor.

2. The method in accordance with claim 1 wherein the step of drying the water from the washed conductor comprises the steps of:
   immersing the washed conductor and adhering water in an alcohol and subsequently drying the alcohol from the washed conductor.

3. The method in accordance with claim 1 further including the step of admixing a flow of soldering material and the polyethylene glycol to effect a substantially uniform dispersion of the polyethylene glycol in the soldering material, and passing the conductor through a crest of said fountain to apply the soldering material thereto.

4. The method of applying solder to a conductor comprising the steps of:
   combining molten solder and a water-soluble polyethylene glycol hydrocarbon to improve the flow characteristics of the molten solder, said molten solder and said hydrocarbon being immiscible and said hydrocarbon removing oxides from said molten solder and acting as a wetting agent for said molten solder relative to the conductor;

passing the conductor through a wave of the combined molten solder and water-soluble hydrocarbon to effect the adhesion of solder to said conductor;

cooling the conductor and adhering solder to solidify said solder;

washing the conductor and adhering solder with water to remove any residual water-soluble hydrocarbon; and drying the water from the washed conductor.

5. The method in accordance with claim 4 comprising the further step of adding a fluxing agent to the combined molten solder and water-soluble hydrocarbon prior to the step of passing the conductor through the combined molten solder, water-soluble hydrocarbon and fluxing material.

* * * * *